United States Patent
Lee et al.

(10) Patent No.: US 8,126,487 B2
(45) Date of Patent: Feb. 28, 2012

(54) NETWORK ACCESS METHOD IN MOBILE COMMUNICATION SYSTEM AND TERMINAL SUPPORTING THE SAME

(75) Inventors: Moon Il Lee, Anyang-si (KR); Bin Chul Ihm, Anyang-si (KR); Wook Bong Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 12/446,443

(22) PCT Filed: Oct. 23, 2007

(86) PCT No.: PCT/KR2007/005207
§ 371 (c)(1),
(2), (4) Date: Apr. 20, 2009

(87) PCT Pub. No.: WO2008/050996
PCT Pub. Date: May 2, 2008

(65) Prior Publication Data
US 2010/0317382 A1    Dec. 16, 2010

Related U.S. Application Data

(60) Provisional application No. 60/862,572, filed on Oct. 23, 2006.

(30) Foreign Application Priority Data

Feb. 12, 2007    (KR) .................. 10-2007-0014212

(51) Int. Cl.
*H04B 15/00*    (2006.01)

(52) U.S. Cl. ........ 455/501; 370/252; 370/294; 455/515; 455/436

(58) Field of Classification Search ............. 455/7, 9, 455/70, 101, 103, 418, 436, 501, 515; 370/252, 370/294, 295, 310, 315, 328, 329, 331, 335, 370/336, 461
See application file for complete search history.

(56) References Cited

U.S. PATENT DOCUMENTS

| | | | |
|---|---|---|---|
| 7,203,490 B2* | 4/2007 | Karabinis et al. ............. | 455/428 |
| 7,551,546 B2* | 6/2009 | Ma et al. ........................ | 370/208 |
| 2006/0126570 A1 | 6/2006 | Kim et al. | |
| 2008/0232329 A1* | 9/2008 | Jen ............................... | 370/335 |
| 2008/0233940 A1* | 9/2008 | Jen ............................... | 455/418 |
| 2010/0064798 A1* | 3/2010 | Inagaki et al. ................. | 73/203 |
| 2010/0093386 A1* | 4/2010 | Damnjanovic et al. ........ | 455/522 |

FOREIGN PATENT DOCUMENTS

| | | |
|---|---|---|
| EP | 1059818 | 12/2000 |
| EP | 1505739 | 2/2005 |

* cited by examiner

*Primary Examiner* — Lam T Mai
(74) *Attorney, Agent, or Firm* — Lee, Hong, Degerman, Kang & Waimey

(57) ABSTRACT

A method for transmitting multiple antenna related information such as a multiple antenna receiver type and/or feedback overhead information to a base station and a terminal for supporting the same are disclosed. Since a size of feedback information is varied depending on the receiver type, it is necessary to properly allocate feedback channel resources suitable for characteristics of a receiving side. To this end, the multiple antenna related information is previously reported to the base station when the terminal initially accesses a network.

9 Claims, 6 Drawing Sheets

NETWORK ACCESS METHOD IN MOBILE COMMUNICATION SYSTEM AND TERMINAL SUPPORTING THE SAME

CROSS-REFERENCE TO RELATED APPLICATIONS

This application is a national stage application of International Application No. PCT/KR2007/005207, filed on Oct. 23, 2007, which claims the benefit of earlier filing date and right of priority to Korean Application No. 10-2007-0014212, filed on Feb. 12, 2007, and U.S. Provisional Application No. 60/862,572, filed on Oct. 23, 2006.

TECHNICAL FIELD

The present invention relates to a method for transmitting multiple antenna related information such as a multiple antenna receiver type and/or feedback overhead information to a base station and a terminal for supporting the same.

BACKGROUND ART

Recently, with the generalization of information communication services, the advent of various multimedia services, and the advent of high quality services, there is an increasing demand for wireless communication services. To actively cope with such a demand, capacity of a communication system should be increased. To increase communication capacity in a wireless communication environment, a method for newly detecting an available frequency band and a method for increasing efficiency of given resources may be considered. Of the methods, an example of the latter method includes a multiple antenna transceiver technique, which has recently received much attention and is actively being developed. The multiple antenna transceiver technique includes obtaining diversity gain by providing a plurality of antennas in a transceiver and additionally ensuring a spatial region for utilizing resources, or increasing transmission capacity by transmitting data in parallel through two or more transmit antennas.

An example of the multiple antenna transceiver technique includes multiple-input multiple-output (MIMO). The MIMO designates an antenna system having multiple inputs and outputs, and can enhance the amount of information by transmitting different kinds of information to each transmitting antenna and enhance reliability of transmission information by using a spatial domain coding scheme such as space-time coding (STC).

Supposing that the number of antennas in a transmitter of the MIMO system and the number of antennas in a receiver of the MIMO system are M and N, respectively, the M transmitting antennas may transmit independent symbols and/or spatially coded symbols by using the same frequency at the same time. Although the respective symbols transmitted from the several transmit antennas simultaneously undergo different fading which is spatially independent while passing through a wireless channel due to spatial scattering effect, such a randomness characteristics of the spatial channel may allow decoupling simultaneously transmitted data symbols at the receiver. The aforementioned MIMO system can be combined with an orthogonal frequency division multiplexing (OFDM) system to enable efficient data transmission.

In addition to the MIMO system, link control schemes such as adaptive modulation and coding (AMC), hybrid automatic request (HARQ), and power control can be used for efficient data transmission. The AMC means a channel adaptive transmission scheme which allows a base station to determine a modulation mode and a coding rate based on feedback information received from terminals and to control a data rate in accordance with the determined modulation mode and coding rate. According to an example of the AMC, if the base station determines a modulation and coding set (MCS) based on CQI information fed back from a terminal and transmits the determined MCS, the terminal transmits data by using a modulation scheme and a coding scheme, which are designated in the MCS.

In general, schemes which enhance system performance through feedback, such as AMC, exert their maximum performance if feedback information such as channel status and motion speed of a user is transmitted from a receiving side whenever data transmission is performed. However, if feedback information is transmitted whenever data transmission is performance, a problem occurs in that overhead excessively occurs in a feedback channel.

Particularly, in a multiple antenna system which uses multiple codeword (MCW), since different MCSs can be set for each codeword, CQI equivalent to the number of codewords should be fed back to enhance system performance. However, this causes overhead to the feedback channel as described above.

DISCLOSURE OF THE INVENTION

Accordingly, the present invention is directed to a network access method in a mobile communication system and a terminal for supporting the same, which substantially obviate one or more problems due to limitations and disadvantages of the related art.

An object of the present invention is to allocate a feedback channel suitable for a status by additionally providing multiple antenna receiver related information to a base station during initial network access considering that multiple antenna related information of uplink report information reported when a terminal initially accesses a network relates to an antenna configuration only and thus fails to exactly reflect required size of feedback information which is varied depending on types of multiple antenna receivers.

As described above, although the size of feedback information is generally proportional to data transmission efficiency, it is difficult to increase feedback information without limit when considering limited feedback channel resources. Accordingly, proper trade-off between the size of feedback information and data transmission efficiency should be taken into account. However, prior to trade-off, if the size of feedback information is varied depending on characteristics of a data receiving side, it is necessary to decrease the size of feedback information above all. Accordingly, the present invention is to allow a feedback channel to be differentially allocated to each terminal by reporting multiple antenna receiver related information to a base station when a terminal initially accesses a network, considering that the size of feedback information to the base station is varied depending on types of multiple antenna receivers in a multiple antenna system.

To achieve these objects and other advantages and in accordance with the purpose of the invention, as embodied and broadly described herein, a network access method of a terminal in a multiple antenna system includes transmitting a random access preamble (RACH access preamble) from the terminal to a base station, receiving a random access response message to the random access preamble from the base station, and transmitting an RRC connection request message to the response message to the base station.

In another aspect of the present invention, a terminal which supports initial network access in a multiple antenna system includes a controller transmitting RACH access preamble to a base station in an idle mode and, if a random access response message to the RACH access preamble is received from the base station, transmitting an RRC connection request message to the response message to the base station.

In other aspect of the present invention, a base station which supports initial network access in a multiple antenna system includes a controller transmitting a random access response message to RACH access preamble to a terminal if the RACH access preamble is received from the terminal, and transmitting a contention resolution message to RRC connection request message to the terminal if the RRC connection message to the response message is received from the terminal.

In the above aspects, the RRC connection request message includes multiple antenna related information, and the multiple antenna related information includes at least one of a multiple antenna receiver type (MIMO receiver type) and feedback overhead indicator information.

The multiple antenna receiver type includes one of a minimum mean squared error (MMSE) receiver, a maximum likelihood (ML) receiver, and a minimum mean squared error with successive interference cancellation (MMSE-SIC) receiver.

A size of channel quality indicator (CQI) information transmitted from the base station is varied depending on at least one of the multiple antenna receiver type and a layer permutation scheme used in a transmitting side.

The layer permutation scheme can be implemented by any one of a virtual antenna permutation (VAP) scheme and a generalized cyclic delay diversity (GCDD) scheme.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

A technique described hereinafter can be used for various communication systems. A communication system is widely deployed to provide various communication services such as voice and packet data. The technique can be used in a downlink or an uplink. The downlink means communication from a base station (BS) to a terminal while the uplink means communication from a terminal to a base station.

The base station generally means a fixed station which communicates with a terminal, and may be referred to as other terminologies such as node-B, enhanced node-B (eNB), base transceiver system (BTS), and access point. The terminal may be fixed or may have mobility, and may be referred to as other terminologies such as mobile station, user equipment (UE), user terminal (UT), subscriber station (SS), and wireless device.

The present invention can be used for a single-carrier or multi-carrier communication system. The multi-carrier communication system can use orthogonal frequency division multiplexing (OFDM) or another multi-carrier modulation scheme. The OFDM partitions an entire system bandwidth into a plurality of subcarriers having orthogonality. The subcarriers may be referred to as tones, and a certain set of the subcarriers may be referred to as a subband. The single-carrier communication system can use a single-carrier modulation scheme such as a single-carrier frequency division multiple access (SC-FDMA) and code division multiple access (CDMA).

Hereinafter, a size of feedback information which is varied depending on types of multiple antenna receivers in a multiple antenna system will be described, and a procedure of performing an initial network access while providing receiver related information to a base station in accordance with the present invention will be described in detail.

Various multiple antenna schemes have been introduced to improve communication performance in MCW based MIMO-OFDM system. One of them is an example of a layer permutation scheme which averages spatial channels across the codewords transmitted at the same time. Examples of the layer permutation scheme include a virtual antenna permutation (VAP) scheme and a generalized cyclic delay diversity (GCDD) scheme.

VAP (Virtual Antenna Permutation)

Figure 1:
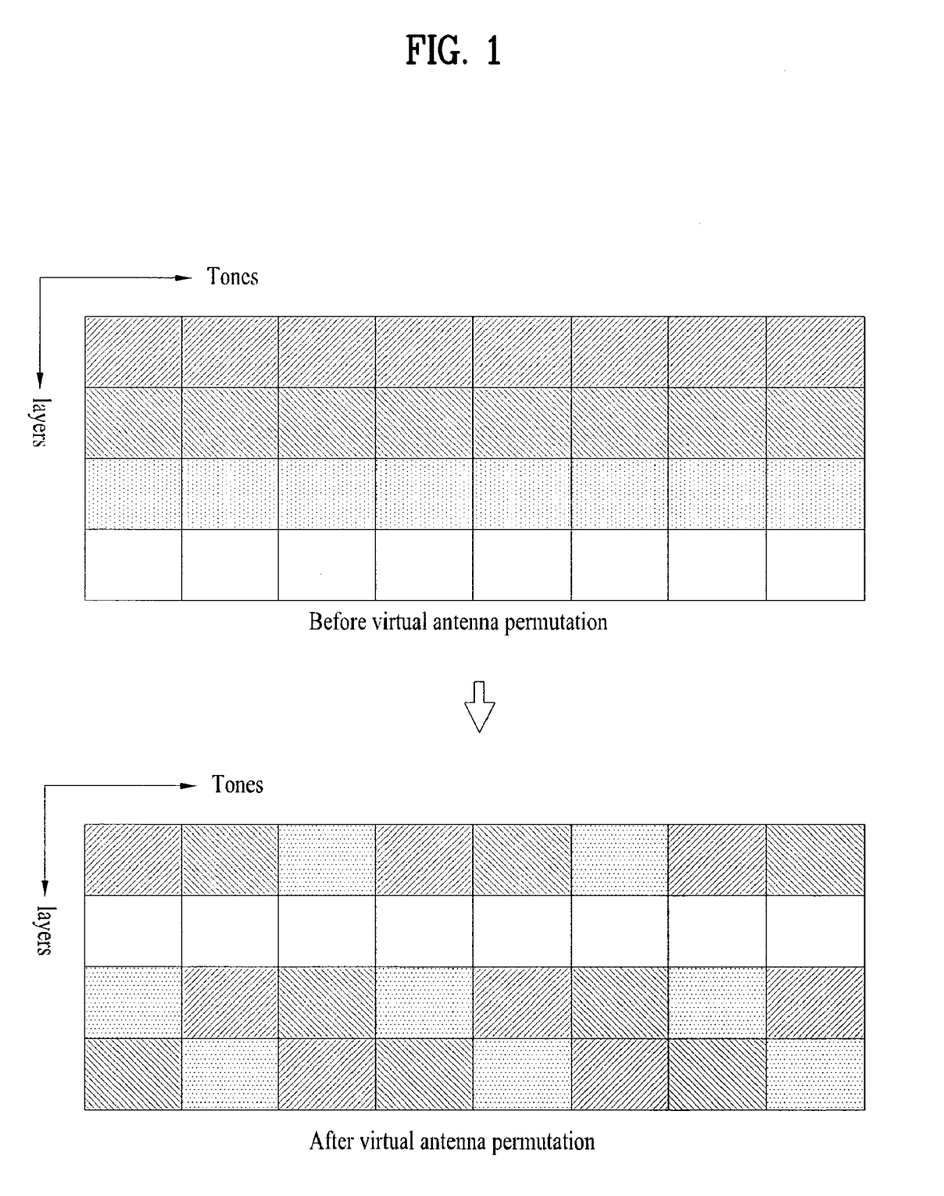
FIG. 1 illustrates a concept of a virtual antenna signaling scheme through VAP (virtual antenna permutation)

FIG. 1 illustrates a concept of a virtual antenna signaling scheme through VAP.

As shown, if codewords allocated to each layer through virtual antenna signaling are permutated, it is possible to obtain an equalizing effect of channels between the respective layers calculated in a receiver, if MMSE receiver is employed. Accordingly, only a channel quality indicator (CQI) for any one of the layers not all the layers is required to be fed back when a receiver such as MMSE is used.

However, if a type of interference canceling MIMO receiver such as a successive interference cancellation (SIC) receiver is used in a receiving side the respective channel of the codewords could be different even using a VAP scheme at the transmitter since an interference level is different according to the codeword. In that sense, CQIs for codeword should have also different sizes in order to take different channel characteristic into account. Accordingly, representative CQI information and its difference value are fed back in the MIMO-SIC receiver.

Figure 2:
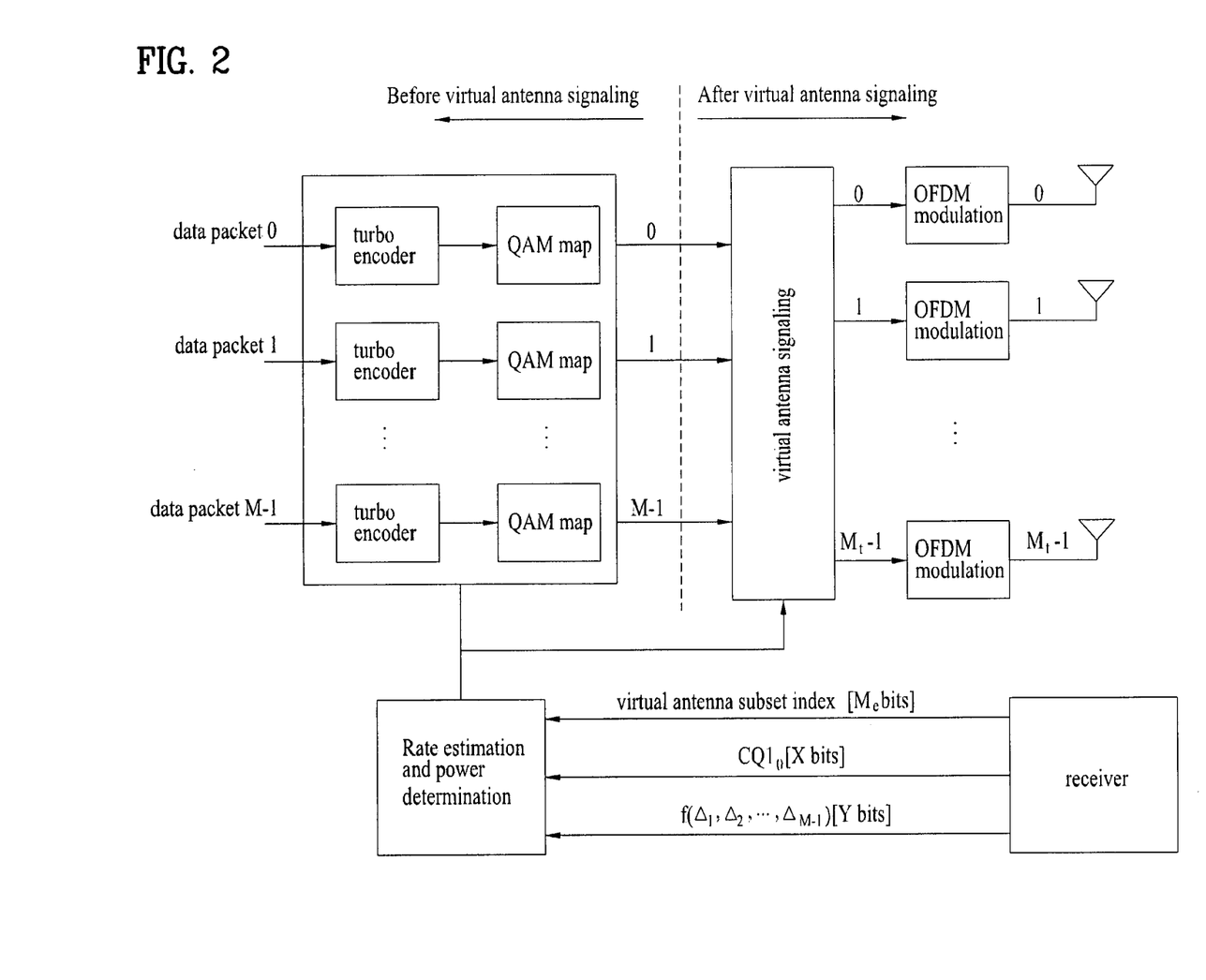
FIG. 2 is a block diagram illustrating a configuration of a basic transmitting side of VAP.

FIG. 2 is a block diagram illustrating a configuration of a basic transmitting side of the VAP. As shown, the transmitting side receives representative CQI information (CQI_1 [X bit]) and differential CQI information having difference value with the representative CQI information (CQI_2 [Y bit]) from the receiver as feedback information for determining transmission power and predicting a transmission rate.

GCDD (Generalized Cyclic Delay Diversity)

Figure 3:
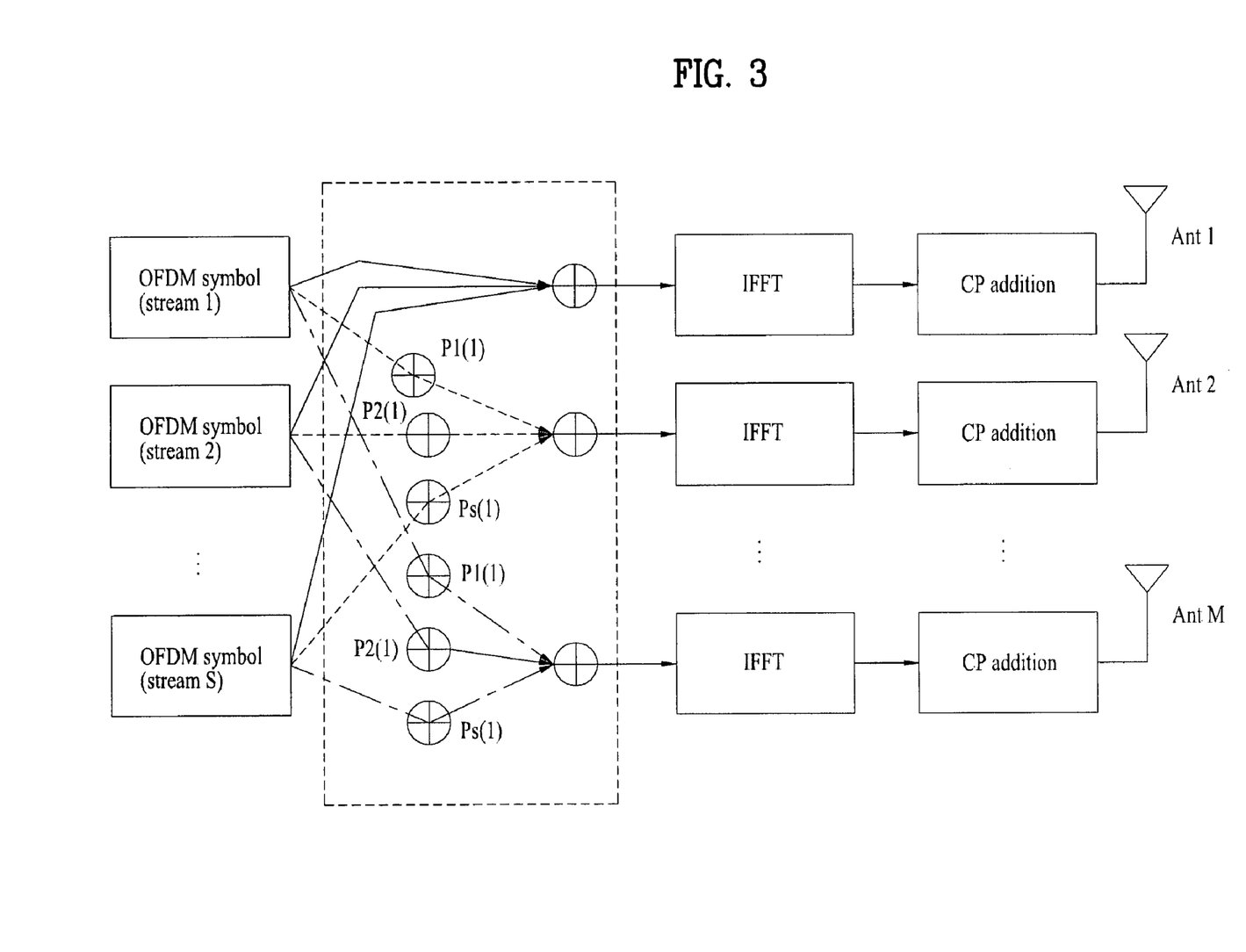
FIG. 3 is a block diagram illustrating a basic concept of GCDD.

FIG. 3 is a block diagram illustrating a basic concept of GCDD scheme.

In GCDD scheme, channels between codewords are averaged by setting characteristics of a precoding matrix differently for subcarriers. In other words, In GCDD scheme, all streams are transmitted through entire antennas by multiplying the streams by precoding matrices in which phase sequences are multiplied with each element.

GCDD scheme can be generalized for a system as following GCDD matrix P, in which the number of antennas is $N_t$ ($N_t$ is a natural number more than 2) and a spatial multiplexing rate is R (R is a natural number more than 1).

$$P^k_{N_t \times R} = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R} \quad \text{[Equation 1]}$$

where the first matrix at the right of an equal sign '=' is a diagonal matrix for phase shift, and the second matrix at the right of an equal sign '=' is a unitary matrix which spreads data symbols of each codeword in spatial domain and it should satisfy the unitary condition as $\mathbb{U}_{N_t \times R}^H \times \mathbb{U}_{N_t \times R} = \mathbb{I}_{R \times R}$ in order not to hurt open-loop channel capacity. In the Equation 1, a phase angle $\theta_i$, i=1,2,3 can be obtained as illustrated in Equation 2 below in accordance with a delay value $\tau_i$, i=1,2,3.

$$\theta_i = \frac{-2\pi}{N_{fft}} \cdot \tau_i \quad \text{[Equation 2]}$$

Where an example of a GCDD matrix P which has two transmitting antennas and uses a codebook of 1 bit is as follows.

$$P^k_{2 \times 2} = \left( \begin{array}{cc} \alpha & \beta \\ \beta & -\alpha \end{array} \right), \quad \alpha^2 + \beta^2 = 1 \quad \text{[Equation 3]}$$

spatial multiplexing rate 1    spatial multiplexing rate 2

In the Equation 3, if a value α is given, a value β is easily determined. Accordingly, information of the value α can be set to two proper values and then can be fed back as a feedback index. For example, some schedule can be determined previously between the transmitter and the receiver in such a manner that the value α is set to 0.2 when a feedback index is equal to 0 while the value α is set to 0.8 when the feedback index is equal to 1.

A predetermined precoding matrix for obtaining signal to noise ratio (SNR) gain can be used as an example of the second matrix. Particularly, an example of a GCDD matrix P which uses a Walsh code as the precoding matrix can be expressed as follows.

$$P^k_{4 \times 4} = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad \text{[Equation 4]}$$

Equation 4 is based on a system which has four transmitting antennas and a spatial multiplexing rate of 4. In this case, the second matrix can be reconfigured properly to select a specific transmitting antenna or tune a spatial multiplexing rate.

The following Equation 5 illustrates that the second matrix is reconfigured to select two antennas in a system which has four transmitting antennas.

$$P^k_{4 \times 4} = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix} \quad \text{[Equation 5]}$$

Also, the following Table 1 illustrates a method for reconfiguring the second matrix to be suitable for a corresponding multiplexing rate if a spatial multiplexing rate is varied depending on time or channel status.

TABLE 1

"다중화율" should be changed as "rank"

spatial multiplexing rate 1
spatial multiplexing rate 4

$$P_{4 \times 4}{}^k = \frac{1}{\sqrt{4}} \begin{pmatrix} e^{j\theta_1^k} & 0 & 0 & 0 \\ 0 & e^{j\theta_2^k} & 0 & 0 \\ 0 & 0 & e^{j\theta_3^k} & 0 \\ 0 & 0 & 0 & e^{j\theta_4^k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

spatial multiplexing rate 2

At this time, although Table 1 illustrates a case where a first column, a (1~2)th column, and a (1~4)th column of the second matrix are selected in accordance with the multiplexing rate, the present invention is not limited to such a case. Any at least one of the first, second, third and fourth columns may be selected and the number of selected columns are according to the multiplexing rate.

Meanwhile, the second matrix may be provided by a codebook in the transmitting side and the receiving side. In this case, the transmitting side receives index information of codebook fed back from the receiving side and selects a unitary matrix (second half matrix) corresponding the received index from its codebook. Then, the transmitting side configures a phase shift based precoding matrix by using the Equation 1 above. Also, the second matrix may be varied periodically, so that carriers transmitted to the same time slot have different precoding matrixes for each frequency band.

In a multiple antenna system using aforementioned schemes on the transmitting side, the size of feedback information is varied depending on the types of the multiple antenna receivers, which is generally employed in the terminal according to the terminal manufactures' preference even for the same single multiple antenna system. Therefore present invention is intended that receiver related information of the terminal is previously reported to the network before data transmission between the terminal and the network is performed, so as to optimally allocate a feedback channel.

Hereinafter, gain that can be obtained by reporting multiple antenna related information during initial access in accordance with a suggestion of the present invention considering various configurations of the receiving side will be described.

First of all, in a receiving side of a general multiple antenna system, a receiving signal model can be expressed by Equation 6 below.

$$y_{N_r \times 1} = H_{N_r \times N_t} s_{N_t \times 1} + n_{N_r \times 1}$$ [Equation 6]

In the Equation 6, $y_{N_r \times 1}$ represents a vector value of a receiving signal received through $N_r$ number of antennas, $H_{N_r \times N_t}$ represents a channel matrix in a multiple antenna system, and $s_{N_t \times 1}$ and $n_{N_r \times 1}$, respectively represent vector values of a transmitting signal and a noise signal.

The transmitting signal in the aforementioned multiple antenna system is estimated by various types of receiving sides of a multiple antenna system. The receiving side of the multiple antenna system can use a receiver of various configurations. Hereinafter, some examples of the receiver will be described.

A first example of the receiver is a minimum mean squared error (MMSE) receiver.

In the MMSE receiver, a procedure of estimating a transmitting signal can be expressed as illustrated in Equation 7 below.

$$\hat{s} = Wy = W(H_{N_r \times N_t} s_{N_t \times 1} + n_{N_r \times 1})$$ [Equation 7]

In the Equation 7, $\hat{S}$ represents a estimated vector of a transmitting signal at the receiver, and $H_{N_r \times N_t}$, $S_{N_t \times 1}$ $n_{N_r \times 1}$ denote vector values of a channel matrix, a transmitting signal, and a noise signal in the multiple antenna system, respectively. Also, W is the matrix as an MMSE filter, and can be obtained in a type of Equation 8 below.

$$W = (H^H H + I\sigma_n)^{-1} H^H$$ [Equation 8]

In the Equation 8, H represents a channel vector, I represents a unitary matrix, and $\sigma_n$ represents a dispersion value of noise in the receiver.

A second example of the receiver is a maximum likelihood (ML) receiver.

In the ML receiver, a procedure of estimating a transmitting signal can be expressed as illustrated in Equation 9 below.

$$\hat{s} = \arg \min \| y - H_{N_r \times N_t} \tilde{s}_{N_t \times 1} \|$$ [Equation 9]

Referring to Equation 9, it is noted that the ML receiver estimates a transmitted vector which has minimum Euclidian distance between receiving signal vector of Equation 6 and a product of $H_{N_r \times N_t}$ and $\tilde{s}_{N_t \times 1}$. Here, $\tilde{s}_{N_t \times 1}$ is a candidate of transmitted signal vector and obtained by combination of all possible transmitting signal vector. A third example of the receiver is a minimum mean squared error with successive interference cancellation (MMSE-SIC) receiver.

Figure 4:
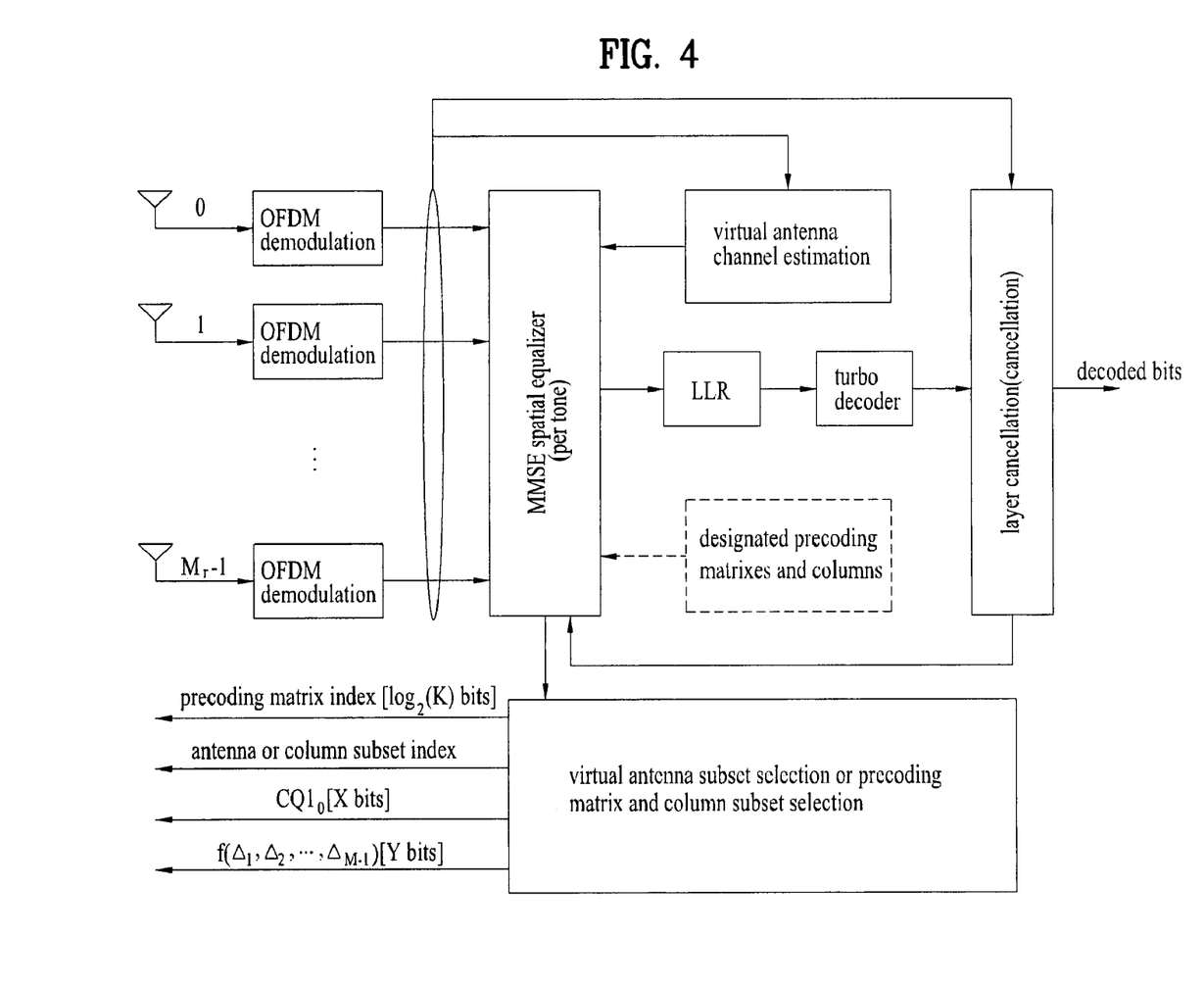
FIG. 4 is a block diagram illustrating a configuration of a Minimum Mean Squared Error with Successive Interference Cancellation (MMSE-SIC) receiver if a transmitting side transmits a signal by using GCDD.

FIG. 4 is a block diagram illustrating a configuration of the MMSE-SIC receiver. If the MMSE-SIC receiver is used in the receiving side, after a signal is decoded through the aforementioned MMSE receiver, a codeword in which error does not occur is removed when the signal is received again, whereby inter-symbol interference is cancelled in other codeword. In particular, FIG. 4 illustrates a case where the transmitting side uses the aforementioned GCDD scheme as a layer permutation scheme.

As shown, the receiving side feeds back virtual antenna subset index to allow the transmitting side to select a virtual antenna to be used for data transmission, feeds back precoding matrix index for designating a precoding matrix which performs GCDD scheme, and feeds back column subset index for designating a spatial multiplexing rate in the precoding matrix.

In addition, since channels between the respective layers are averaged through GCDD scheme, feedback of only a channel quality indicator (CQI) for any one of the layers is required. However, if the MIMO receiver of the SIC scheme is used, since an interference level between the respective layers is varied, like the aforementioned VAP, representative CQI information (CQI_1 [X bit]) and the differential CQI information having difference value with the representative CQI information (CQI_2 [Y bit]) are fed back to the transmitting side.

If a configuration of the receiver is varied for each terminal, a size of CQI information fed back from each terminal may be varied. For example, supposing that the number of codewords is maximum two in a multiple codeword system, the terminal should always feed back CQI information of two codewords to the base station so as to obtain optimized system performance.

At this time, to reduce feedback overhead, Δ(delta) CQI which is a difference value between the first codeword and the second codeword is used as CQI of the second codeword. In other words, Δ CQI is obtained in such a manner that CQI_1 information of the first codeword is fed back by using 5 bits, for example, and CQI_2 information of the second codeword is a difference value CQI_1-CQI_2 and is fed back by using 3 bits, for example.

In this case, since a range of CQI_2 information is varied depending on a multiple antenna receiving side, the base station can perform CQI information feedback more precisely if it knows a type of a multiple antenna receiver of each terminal.

Additionally, if a multiple antenna scheme which averages channels of respective layers is used in a multiple codeword (MCW) system, information of the MIMO receiver can be used more suitably.

The following Equation 10 illustrates a receiving signal model of a signal to which a layer permutation scheme is applied, wherein the layer permutation scheme equalizes channels of layers in accordance with the number of layers or a spatial multiplexing rate.

$$y_{N_r \times 1}(k) = H_{N_r \times N_t}(k) \underbrace{w(k) \Phi^k x(k)}_{s_{N_t \times 1}} + n_{N_r \times 1}$$ [Equation 10]

In the Equation 10, k represents subcarrier or resource index. And, $H_{N_r \times N_t}$ represents a channel matrix in the multiple antenna system, w represents a precoding matrix, represents a matrix for application of a layer permutation scheme, and x represents a transmitting data symbol vector. Also, $S_{N_t \times 1}$ and $n_{N_r \times 1}$ respectively represent vector values of a transmitting signal and a noise signal.

The following Equation 11 illustrates an example of vector for application of a layer permutation scheme.

Spatial multiplexing rate of 2   [Equation 11]

$$\Phi_{2\times 2}^k = \begin{pmatrix} 0 & 1 \\ 1 & 0 \end{pmatrix}^k$$

Spatial multiplexing rate of 3

$$\Phi_{3\times 3}^k = \begin{pmatrix} 0 & 1 & 0 \\ 0 & 0 & 1 \\ 1 & 0 & 0 \end{pmatrix}^k$$

-continued

Spatial multiplexing rate of 4

$$\Phi_{4\times 4}^k = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k$$

If a multiple antenna signal is generated and transmitted in types of Equation 10 and Equation 11, an example of CQI configuration according to the MIMO receiver is shown in Table 2.

TABLE 2

| | Type of receiver | | | |
|---|---|---|---|---|
| | MMSE receiver | | MMSE-SIC receiver | |
| CQI information | CQI_1 | CQI_2 | CQI_1 | CQI_2 |
| bits | 5 bits | 0 bit | 5 bits | 3 bits |

As shown in Table 2 above, any one of the receivers can use adaptive modulation and coding (AMC) scheme properly without information of CQI_2 as the case may be. Accordingly, if the base station knows information of the MIMO receiver of the terminal, size of the feedback information can be reduced remarkably. For example, if the base station knows that the MIMO receiver of the terminal is MMSE receiver, the terminal can transmit only CQI_1 and size of the CQI feedback information can be reduced to 5 bits.

If the size of feedback information is used uniformly without considering the type of the MIMO receiver of the terminal, 3 bits reserved for CQI_2 information in Table 2 may be used as either feedback bits for indicating a precoding vector or feedback bits for indicating rank information if the base station knows information of the MIMO receiver of the terminal.

Additionally, the layer permutation scheme of Equation 11 above can be expressed by the following Equation 12.

$$\Phi_{R\times R}^k = D(k)U \qquad \text{[Equation 12]}$$

Also, examples of D(k) and U matrix in Equation 12 above are shown in Table 3 below.

TABLE 3

| Spatial multiplexing rate R | U | D(k) |
|---|---|---|
| 1 | $[1]$ | $[1]$ |
| 2 | $\begin{bmatrix} 1 & 1 \\ 1 & e^{-j2\pi/2} \end{bmatrix}$ | $\begin{bmatrix} 1 & 0 \\ 0 & e^{-j2\pi k/2} \end{bmatrix}$ |
| 3 | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi k/3} & 0 \\ 0 & 0 & e^{-j4\pi k/3} \end{bmatrix}$ |
| 4 | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi k/4} & 0 & 0 \\ 0 & 0 & e^{-j4\pi k/4} & 0 \\ 0 & 0 & 0 & e^{-j6\pi k/4} \end{bmatrix}$ |

As described above, since the size of the feedback information is varied depending on the type of the multiple antenna receiver, which is adopted in the terminal, in the same single multiple antenna system, the present invention is intended that receiver related information of the terminal is previously reported to the network before data transmission between the terminal and the network is performed, so as to optimally allocate a feedback channel.

Initial Network Access Method of Terminal According to the Present Invention

The procedure of reporting multiple antenna receiver related information while a terminal initially accesses a network will be described in detail.

In a mobile communication system, a terminal which is in an idle mode uses a random access channel (RACH) to transmit an initial control message to a network. In other words, the RACH is used to allow the terminal to adapt time synchronization with the network. Alternatively, the RACH is used to acquire radio resources if there are no radio resources in an uplink to which data are to be transmitted when the terminal intends to perform data transmission to the uplink.

For example, if the terminal is powered on and intends to initially access a new cell, the terminal adapts synchronization of a downlink and receives system information of a cell which the terminal wishes to access. Afterwards, the terminal should transmit RRC connection request message for RRC connection to the uplink.

However, since the terminal is not time-synchronized with the current network and fails to ensure radio resources of the uplink, the terminal requests the network through the RACH to provide radio resources for transmission of the RRC connection request message. The base station which has been requested from the terminal to provide radio resources allocates suitable radio resources to the corresponding terminal to transmit the RRC connection request message.

For another example, the case where the terminal is in an RRC connected mode as RRC connection is formed between the terminal and the network may be considered. In this case, the terminal is allocated with radio resources in accordance with radio resource scheduling of the network, and transmits user data to the network through the radio resources. However, if data to be transmitted do not remain in a buffer of the terminal any more, the network does not allocate the radio resources to the corresponding terminal any more. At this time, since there are no radio resources in the terminal even though new data are generated in the buffer of the terminal to which radio resources are not allocated, the terminal should request the network through the RACH to allocate radio resources required for data transmission.

Hereinafter, in a long term evolution (LTE) system that has received attention as the next generation communication standard, the procedure of initial access of the terminal to the network in accordance with the present invention will be described. At this time, it is supposed that the terminal performs initial access through the RACH.

Figure 5:
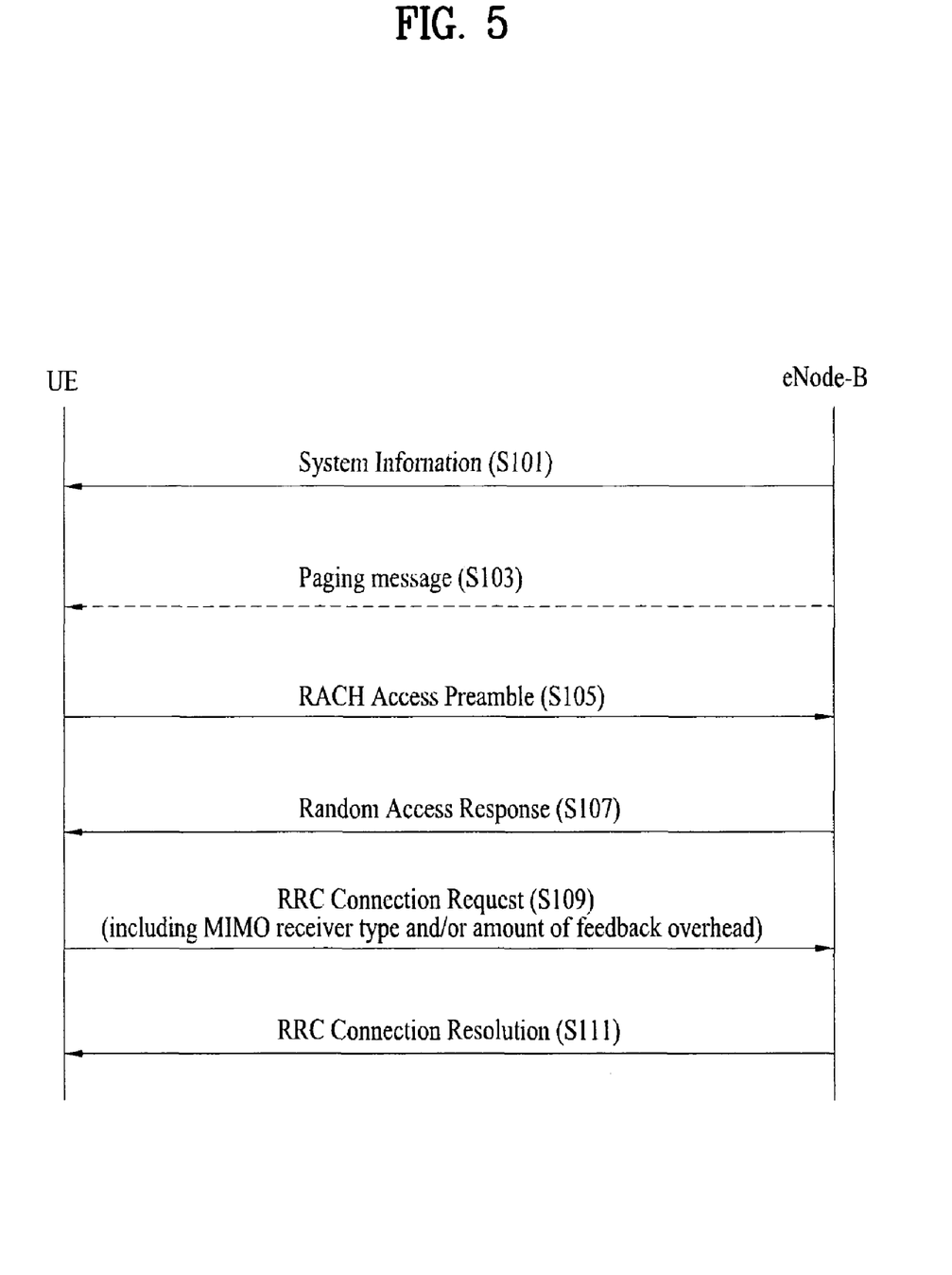
FIG. 5 is a signal flow chart illustrating a procedure of initial access of a terminal according to the present invention.

FIG. 5 is a signal flow chart illustrating the procedure of initial access of the terminal according to the present invention.

The terminal acquires information required for network access request through system information which is broadcasted from the base station (S101). The information required for network access request may be acquired through a paging message from the base station (S103).

The terminal transmits a random access preamble to the base station by using the information received through the system information or the paging message (S105). If the random access preamble of the terminal is received, the base station transmits a random access response message to the terminal (S107), wherein the random access response message includes a correction value (timing advance (TA)) of time synchronization with the base station, radio resource allocation information of the uplink for transmission of the RRC connection request message, etc.

The terminal which has received the response message identifies information of various system configurations included in the terminal, and transmits the identified information to the base station along with the RRC connection request message (S109). At this time, the information of the system configurations may include at least one of MIMO receiver type of the terminal (MIMO receiver type) and feedback overhead indicator information in addition to UE antenna configuration for implementing the multiple antenna scheme. The UE antenna configuration for implementing the multiple antenna scheme, the MIMO receiver type, and the feedback overhead indicator information will commonly be designated as multiple antenna related information.

If the RRC connection request message is received from the terminal, the base station transmits a contention resolution message to the terminal (S111). The contention resolution message may include an RRC connection setup message which indicates that RRC access has been completed.

If the terminal accesses the network through the aforementioned steps, the base station allocates resources equivalent to feedback overhead, which is requested from the corresponding terminal, to a multiple antenna channel for CQI or uplink control signal, based on the multiple antenna related information transmitted from the terminal in step S109. Afterwards, CQI equivalent to the allocated resources and various kinds of control information are periodically fed back to the base station, and the base station determines a modulation and coding set (MCS) based on the information fed back to the base station and transmits the determined data to the terminal.

Terminal which Supports Initial Network Access Method

Figure 6:
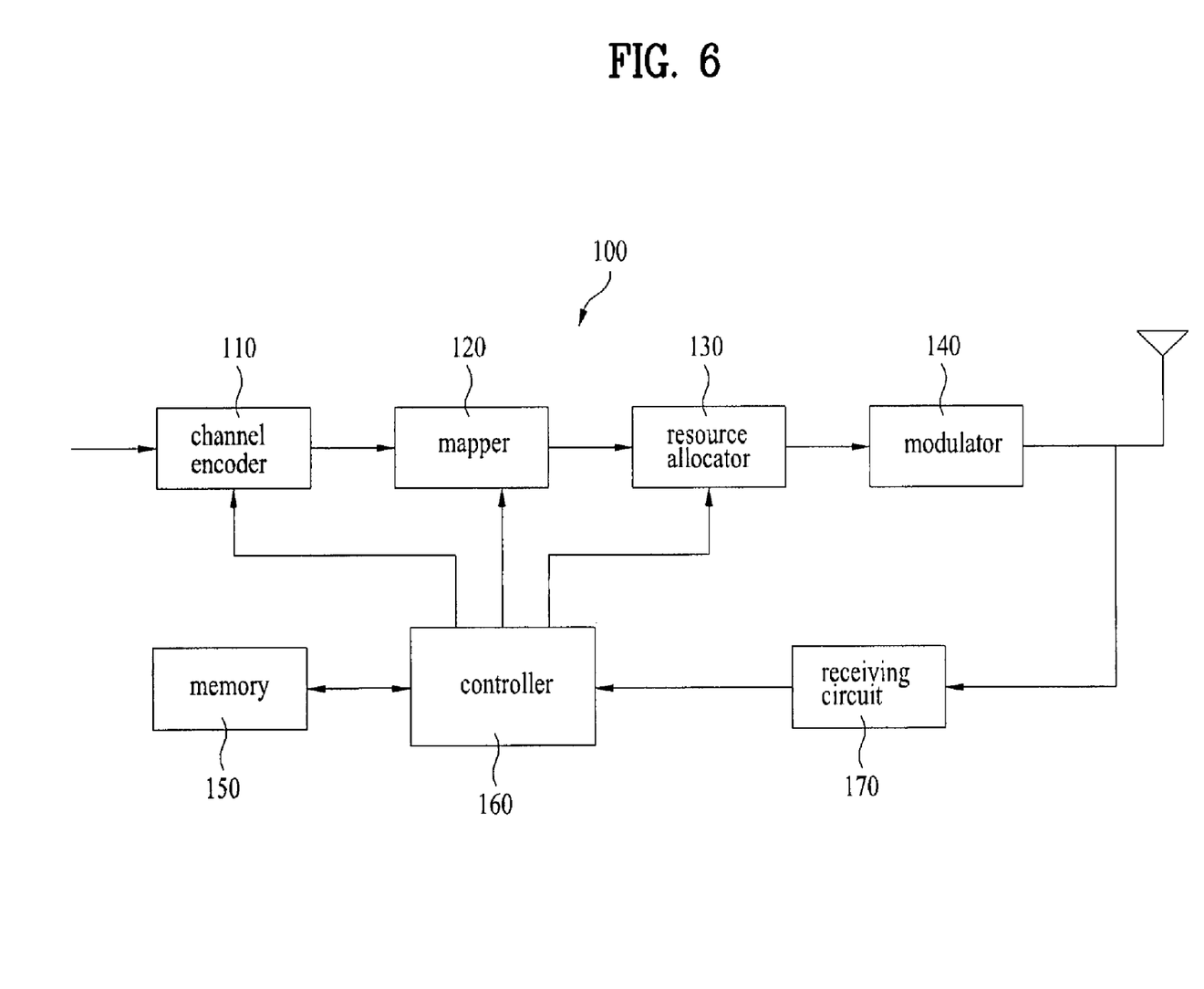
FIG. 6 is a block diagram illustrating a configuration of a terminal which supports an initial network access method according to the present invention.

A configuration of the terminal which supports the aforementioned initial network access method will be described below. FIG. 6 is a block diagram illustrating the configuration of the terminal which supports the initial network access method according to the present invention.

Referring to FIG. 6, a transmitter, for example terminal 100 includes a channel encoder 110, a mapper 120, a resource allocator 130, a modulator 140, a memory 150, a controller 160, and a receiving circuit 170.

The channel encoder 110 receives streams of information bits, and encodes them in accordance with a given coding scheme to form coded data. The streams of information bits may include text, audio, video, or other data.

The channel encoder 110 may add error detection bits such as cyclic redundancy check (CRC) bits to each of the streams of information bits, and add redundant codes for error correction thereto. The error correction codes may be, but not limited to, any one of turbo codes, low density parity check (LDPC) codes, and convolution codes. Other codes for error correction may be used as the error correction codes.

The mapper 120 modulates the coded data of the streams of information bits in accordance with a modulation scheme which is previously determined, so as to provide transmission symbols. The coded data are mapped to symbols, which express position according to amplitude and phase constellation, by the mapper 120. There is no limitation in the modulation scheme, and the modulation scheme could be m-PSK (m-quadrature phase shift keying) or m-QAM (m-quadrature amplitude modulation). Examples of the m-PSK include BPSK, QPSK, and 8-PSK, and examples of the m-QAM include 16-QAM, 64-QAM, and 256-QAM.

The resource allocator 130 allocates resources to transmission symbols in accordance with a resource allocation scheme reported from the controller 160. Examples of the resource allocation scheme include a successive allocation scheme, a dispersion allocation scheme, and a group allocation scheme. A frequency (or time) hopping scheme may be applied to these resource allocation schemes.

The modulator 140 modulates the transmission symbols in accordance with a multiple access modulation scheme. There is no limitation in the multiple access modulation scheme. Examples of the multiple access modulation scheme include a single-carrier modulation scheme such as CDMA which is well known, and a multi-carrier modulation scheme such as OFDM.

The memory 150 is provided with a space for temporarily storing fed-back channel information, and stores an MCS look-up table for supporting AMC scheme according to the successive allocation scheme and/or a precoding book for supporting GCDD. The MCS look-up table includes at least one of a coding rate item to be applied to input information bits, a modulation scheme item, and an MCS level index item matched with the coding rate item and the modulation scheme item. The precoding book includes at least one of phase shift based precoding matrixes for performing GCDD scheme The receiving circuit 170 receives a signal transmitted from the receiver through an antenna, digitalizes the signal, and sends the digitalized signal to the controller 160. Information extracted from the signal received in the receiving circuit 170 may include channel quality indicator (CQI) information. The CQI information is information for feeding back channel status, coding scheme and modulation scheme to the transmitter 100. In more detail, the CQI information may include at least one of power information per channel, SNR information per channel, and index information for designating a specific coding rate and/or a modulation scheme (or modulation size). Instead of the SNR, a signal to interference and noise ratio (SINR) may be used. Modulation and coding scheme (MCS) level index may be used as the index information.

The controller 160 controls the entire operation of the transmitter 100, identifies information of various system configurations of the terminal if a response message to a random access preamble is received from the base station during initial network access, and transmits the identified information to the base station along with the RRC connection request message. At this time, the information of the system configurations may include at least one of MIMO receiver type of the terminal (MIMO receiver type) and feedback overhead indicator information in addition to UE antenna configuration for implementing the multiple antenna scheme.

Furthermore, the controller 160 may further include an AMC module (not shown), which determines a coding rate and a modulation scheme which will be applied to input information bits, with reference to the MCS level index and the MCS look-up table which are fed back.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

According to the present invention, since resources of the feedback channel can be allocated properly depending on the type of the multiple antenna receiver, it is possible to solve the problems of the related art, in which unnecessary feedback overhead occurs due to uniform feedback channel allocation and channel resources are wasted.

What is claimed is:

1. A network access method of a terminal in a multiple antenna system, the network access method comprising:
   transmitting a random access channel (RACH) preamble;
   receiving a random access response message in response to the RACH preamble; and
   transmitting an RRC connection request message in response to the random access response message,
   wherein the RRC connection request message includes multiple antenna related information.

2. The network access method of claim 1, wherein the multiple antenna related information includes at least a multiple antenna receiver type or feedback overhead indicator information.

3. The network access method of claim 2, wherein the multiple antenna receiver type includes a minimum mean squared error (MMSE) receiver, a maximum likelihood (ML) receiver, or a minimum mean squared error with successive interference cancellation (MMSE-SIC) receiver.

4. The network access method of claim 2, wherein a size of channel quality indicator (CQI) information received from a transmitting side is varied depending on at least the multiple antenna receiver type or a layer permutation scheme used.

5. The network access method of claim 4, wherein the layer permutation scheme includes a virtual antenna permutation (VAP) scheme or a generalized cyclic delay diversity (GCDD) scheme.

6. A terminal which supports initial network access in a mobile communication system, the terminal comprising:
   a transmitter configured to transmit a preamble or a message; and
   a controller configured to control the transmitter to transmit a random access channel (RACH) preamble in an idle mode, and to transmit an RRC connection request message in response to a random access response message if the random access response message in response to the RACH preamble is received,
   wherein the RRC connection request message includes multiple antenna related information.

7. The terminal of claim 6, wherein the multiple antenna related information includes at least a multiple antenna receiver type or feedback overhead indicator information.

8. The terminal of claim 7, wherein the multiple antenna receiver type includes a minimum mean squared error (MMSE) receiver, a maximum likelihood (ML) receiver, or a minimum mean squared error with successive interference cancellation (MMSE-SIC) receiver.

9. A base station which supports initial network access in a mobile communication system, the base station comprising:
   a transmitter configured to transmit a message; and
   a controller configured to control the transmitter to transmit a random access response message in response to a random access channel (RACH) preamble if the RACH preamble is received, and to transmit a contention resolution message in response to an RRC connection request message if the RRC connection request message in response to the random access response message is received,
   wherein the RRC connection request message includes multiple antenna related information.

* * * * *